United States Patent
Orttung et al.

(10) Patent No.: US 8,117,073 B1
(45) Date of Patent: Feb. 14, 2012

(54) METHOD AND SYSTEM FOR DELEGATION OF TRAVEL ARRANGEMENTS BY A TEMPORARY AGENT

(75) Inventors: Mark Orttung, Menlo Park, CA (US); Geff Gilligan, Danville, CA (US); Jay GaBany, San Jose, CA (US)

(73) Assignee: Rearden Commerce, Inc., Foster City, CA (US)

( * ) Notice: Subject to any disclaimer, the term of this patent is extended or adjusted under 35 U.S.C. 154(b) by 876 days.

(21) Appl. No.: 10/943,608

(22) Filed: Sep. 17, 2004

(51) Int. Cl.
*G06Q 30/00* (2006.01)
*H04M 3/42* (2006.01)

(52) U.S. Cl. .......................................... 705/26; 455/416
(58) Field of Classification Search ................... 705/26; 455/416
See application file for complete search history.

(56) References Cited

U.S. PATENT DOCUMENTS

| | | | |
|---|---|---|---|
| 4,969,136 A * | 11/1990 | Chamberlin et al. | 369/29.01 |
| 5,237,499 A * | 8/1993 | Garback | 705/5 |
| 5,289,531 A * | 2/1994 | Levine | 379/93.23 |
| 5,459,859 A * | 10/1995 | Senda | 707/10 |
| 5,513,126 A | 4/1996 | Harkins et al. | |
| 5,623,404 A * | 4/1997 | Collins et al. | 705/9 |
| 5,655,081 A * | 8/1997 | Bonnell et al. | 709/202 |
| 5,765,140 A * | 6/1998 | Knudson et al. | 705/9 |
| 5,790,974 A * | 8/1998 | Tognazzini | 455/456.5 |
| 5,802,492 A | 9/1998 | DeLorme et al. | |
| 5,812,844 A * | 9/1998 | Jones et al. | 718/104 |
| 5,832,451 A * | 11/1998 | Flake et al. | 705/5 |
| 5,832,453 A * | 11/1998 | O'Brien | 705/6 |
| 5,875,436 A * | 2/1999 | Kikinis | 705/34 |
| 5,948,040 A * | 9/1999 | DeLorme et al. | 701/201 |
| 5,966,658 A | 10/1999 | Kennedy et al. | |
| 6,016,478 A * | 1/2000 | Zhang et al. | 705/9 |
| 6,023,679 A * | 2/2000 | Acebo et al. | 705/5 |
| 6,038,542 A * | 3/2000 | Ruckdashel | 705/9 |
| 6,041,305 A * | 3/2000 | Sakurai | 705/5 |

(Continued)

OTHER PUBLICATIONS

Reed, Dan et al., "More people find ways to squeeze fun into work trips; For many business travelers, taking family or friends on a trip at relatively low cost has become a handy job perk," USA Today, McLean VA, May 20, 2003, p. E12. Sharkey, Joe, "Leisure activities are increasingly being fitted in to help make life on the road less of a grind," The New York Times, New York, N.Y., Apr. 18, 2001, p. C6.

*Primary Examiner* — Matthew S Gart
*Assistant Examiner* — Ashford S Hayles
(74) *Attorney, Agent, or Firm* — Greenberg Traurig, LLP

(57) ABSTRACT

A method and system for delegation of service procurement by a temporary agent. In one embodiment, in response to an event, a first entity is automatically identified to adjust travel or meeting plans pre-established for one or more group members. The identified first entity adjusts the pre-established travel or meeting plans for one or more members, and notifies one or more group members of the adjustment to the pre-established travel or meeting plans. In one embodiment, the identified first entity is at least one of the one or more group members, not one of the one or more group members, or a software agent. In one embodiment, in response to an unavailability of the first entity, a predetermined alternative first entity is identified to adjust the pre-established travel or meeting plans. In one embodiment, in response to receiving a decline from one or more group members, the one or more group members are presented with one or more second travel or meeting adjustments. In one embodiment, the adjusting of the pre-established travel or meeting plans is based at least in part on a profile of one or more group members.

18 Claims, 12 Drawing Sheets

U.S. PATENT DOCUMENTS

| | | | |
|---|---|---|---|
| 6,047,327 A * | 4/2000 | Tso et al. | 709/232 |
| 6,091,956 A | 7/2000 | Hollenberg | |
| 6,094,681 A * | 7/2000 | Shaffer et al. | 709/224 |
| 6,101,480 A * | 8/2000 | Conmy et al. | 705/9 |
| 6,104,788 A * | 8/2000 | Shaffer et al. | 379/93.17 |
| 6,144,942 A * | 11/2000 | Ruckdashel | 705/9 |
| 6,157,945 A | 12/2000 | Balma et al. | |
| 6,163,748 A | 12/2000 | Guenther | |
| 6,249,252 B1 | 6/2001 | Dupray | |
| 6,292,830 B1 | 9/2001 | Taylor et al. | |
| 6,317,686 B1 | 11/2001 | Ran | |
| 6,336,072 B1 | 1/2002 | Takayama et al. | |
| 6,360,205 B1 * | 3/2002 | Iyengar et al. | 705/5 |
| 6,370,566 B2 * | 4/2002 | Discolo et al. | 709/206 |
| 6,381,578 B1 | 4/2002 | DeMarcken | |
| 6,381,640 B1 * | 4/2002 | Beck et al. | 709/223 |
| 6,389,454 B1 * | 5/2002 | Ralston et al. | 709/204 |
| 6,392,669 B1 * | 5/2002 | Matoba et al. | 715/751 |
| 6,442,526 B1 * | 8/2002 | Vance et al. | 705/5 |
| 6,457,045 B1 * | 9/2002 | Hanson et al. | 709/206 |
| 6,457,062 B1 * | 9/2002 | Pivowar et al. | 709/248 |
| 6,480,830 B1 * | 11/2002 | Ford et al. | 705/9 |
| 6,484,033 B2 * | 11/2002 | Murray | 455/456.3 |
| 6,496,568 B1 * | 12/2002 | Nelson | 379/88.12 |
| 6,529,136 B2 * | 3/2003 | Cao et al. | 340/686.1 |
| 6,549,939 B1 | 4/2003 | Ford et al. | |
| 6,560,456 B1 | 5/2003 | Lohtia et al. | |
| 6,574,605 B1 * | 6/2003 | Sanders et al. | 705/7.26 |
| 6,578,005 B1 * | 6/2003 | Lesaint et al. | 705/8 |
| 6,584,489 B1 * | 6/2003 | Jones et al. | 718/104 |
| 6,591,263 B1 | 7/2003 | Becker et al. | |
| 6,640,230 B1 * | 10/2003 | Alexander et al. | 707/10 |
| 6,650,902 B1 * | 11/2003 | Richton | 455/456.3 |
| 6,658,093 B1 * | 12/2003 | Langseth et al. | 379/88.17 |
| 6,714,916 B1 | 3/2004 | Robertson et al. | |
| 6,788,946 B2 * | 9/2004 | Winchell et al. | 455/459 |
| 6,801,763 B2 | 10/2004 | Elsey et al. | |
| 6,836,537 B1 * | 12/2004 | Zirngibl et al. | 379/67.1 |
| 6,842,737 B1 * | 1/2005 | Stiles et al. | 705/6 |
| 6,847,988 B2 * | 1/2005 | Toyouchi et al. | 709/203 |
| 6,944,447 B2 | 9/2005 | Portman et al. | |
| 6,980,993 B2 | 12/2005 | Horvitz et al. | |
| 6,993,503 B1 * | 1/2006 | Heissenbuttel et al. | 705/37 |
| 7,013,149 B2 | 3/2006 | Vetro et al. | |
| 7,023,979 B1 * | 4/2006 | Wu et al. | 379/265.11 |
| 7,031,998 B2 * | 4/2006 | Archbold | 709/201 |
| 7,072,886 B2 | 7/2006 | Salmenkaita et al. | |
| 7,076,451 B1 * | 7/2006 | Coupland et al. | 705/26 |
| 7,080,019 B1 | 7/2006 | Hurzeier | |
| 7,080,021 B1 | 7/2006 | McCulloch | |
| 7,124,024 B1 | 10/2006 | Adelaide et al. | |
| 7,124,087 B1 * | 10/2006 | Rodriguez et al. | 705/5 |
| 7,137,099 B2 | 11/2006 | Knight et al. | |
| 7,139,718 B2 * | 11/2006 | Jeyachandran et al. | 705/8 |
| 7,162,254 B1 | 1/2007 | Smith | |
| 7,171,369 B1 * | 1/2007 | Bertram et al. | 705/1 |
| 7,263,664 B1 * | 8/2007 | Daughtrey | 715/764 |
| 7,277,923 B2 | 10/2007 | Rensin et al. | |
| 7,280,823 B2 | 10/2007 | Ternullo et al. | |
| 7,284,002 B2 | 10/2007 | Doss et al. | |
| 7,289,812 B1 | 10/2007 | Roberts et al. | |
| 7,330,112 B1 | 2/2008 | Emigh et al. | |
| 7,337,125 B2 * | 2/2008 | Kraft et al. | 705/10 |
| 7,340,403 B1 * | 3/2008 | DeMarcken | 705/5 |
| 7,353,182 B1 * | 4/2008 | Missinhoun et al. | 705/7.12 |
| 7,376,662 B2 * | 5/2008 | Caparas et al. | 1/1 |
| 7,428,302 B2 * | 9/2008 | Zirngibl et al. | 379/88.12 |
| 7,441,203 B2 | 10/2008 | Othmer et al. | |
| 7,565,331 B2 | 7/2009 | Cutler et al. | |
| 7,599,847 B2 | 10/2009 | Block et al. | |
| 7,706,808 B1 | 4/2010 | Aggarwal et al. | |
| 7,747,719 B1 * | 6/2010 | Horvitz et al. | 709/223 |
| 7,870,240 B1 * | 1/2011 | Horvitz | 709/223 |
| 2001/0014867 A1 * | 8/2001 | Conmy | 705/9 |
| 2001/0021928 A1 * | 9/2001 | Ludwig et al. | 705/67 |
| 2001/0025314 A1 * | 9/2001 | Matsumoto et al. | 709/227 |
| 2001/0029425 A1 | 10/2001 | Myr | |
| 2001/0049637 A1 * | 12/2001 | Tso | 705/26 |
| 2002/0010604 A1 * | 1/2002 | Block | |
| 2002/0026336 A1 * | 2/2002 | Eizenburg et al. | 705/5 |
| 2002/0032591 A1 * | 3/2002 | Mahaffy et al. | 705/8 |
| 2002/0065688 A1 | 5/2002 | Charlton et al. | |
| 2002/0072938 A1 | 6/2002 | Black et al. | |
| 2002/0077122 A1 | 6/2002 | Yule | |
| 2002/0095454 A1 * | 7/2002 | Reed et al. | 709/201 |
| 2002/0111845 A1 * | 8/2002 | Chong | 705/8 |
| 2002/0115430 A1 * | 8/2002 | Hall | 455/414 |
| 2002/0123280 A1 | 9/2002 | Saiz | |
| 2002/0131565 A1 * | 9/2002 | Scheuring et al. | 379/88.19 |
| 2002/0143655 A1 | 10/2002 | Elston et al. | |
| 2002/0151321 A1 * | 10/2002 | Winchell et al. | 455/519 |
| 2002/0178019 A1 * | 11/2002 | Anderson et al. | 705/1 |
| 2002/0178022 A1 * | 11/2002 | Anderson et al. | 705/1 |
| 2002/0178034 A1 * | 11/2002 | Gardner et al. | 705/5 |
| 2002/0178226 A1 * | 11/2002 | Anderson et al. | 709/206 |
| 2002/0198747 A1 * | 12/2002 | Boyer et al. | 705/5 |
| 2003/0018499 A1 * | 1/2003 | Miller et al. | 705/5 |
| 2003/0028390 A1 | 2/2003 | Stern et al. | |
| 2003/0036928 A1 * | 2/2003 | Kenigsberg et al. | 705/5 |
| 2003/0040944 A1 | 2/2003 | Hileman | |
| 2003/0050964 A1 | 3/2003 | Debaty et al. | |
| 2003/0055689 A1 | 3/2003 | Block | |
| 2003/0058842 A1 * | 3/2003 | Bud | 370/352 |
| 2003/0120526 A1 | 6/2003 | Altman et al. | |
| 2003/0120530 A1 | 6/2003 | Casati et al. | |
| 2003/0126095 A1 | 7/2003 | Allen | |
| 2003/0140172 A1 * | 7/2003 | Woods et al. | 709/248 |
| 2003/0149781 A1 | 8/2003 | Yared et al. | |
| 2003/0171973 A1 | 9/2003 | Wilce et al. | |
| 2003/0174826 A1 * | 9/2003 | Hesse | 379/210.01 |
| 2003/0177045 A1 * | 9/2003 | Fitzgerald et al. | 705/6 |
| 2003/0195811 A1 * | 10/2003 | Hayes et al. | 705/26 |
| 2003/0220835 A1 | 11/2003 | Barnes, Jr. | |
| 2003/0225600 A1 * | 12/2003 | Slivka et al. | 705/5 |
| 2003/0233265 A1 * | 12/2003 | Lee et al. | 705/8 |
| 2004/0002876 A1 * | 1/2004 | Sommers et al. | 705/6 |
| 2004/0015380 A1 * | 1/2004 | Timmins | 705/8 |
| 2004/0019606 A1 * | 1/2004 | Ackerman et al. | 707/104.1 |
| 2004/0064355 A1 * | 4/2004 | Dorenbosch et al. | 705/9 |
| 2004/0064445 A1 | 4/2004 | Pfeging et al. | |
| 2004/0064585 A1 * | 4/2004 | Doss et al. | 709/246 |
| 2004/0073615 A1 * | 4/2004 | Darling | 709/206 |
| 2004/0088107 A1 | 5/2004 | Seligmann | |
| 2004/0088392 A1 | 5/2004 | Barrett et al. | |
| 2004/0102979 A1 * | 5/2004 | Robertson et al. | 705/1 |
| 2004/0117275 A1 * | 6/2004 | Billera | 705/28 |
| 2004/0133438 A1 | 7/2004 | Zeisset et al. | |
| 2004/0148207 A1 * | 7/2004 | Smith et al. | 705/6 |
| 2004/0199411 A1 * | 10/2004 | Bertram et al. | 705/5 |
| 2004/0204977 A1 * | 10/2004 | Obert | 705/8 |
| 2004/0220847 A1 * | 11/2004 | Ogushi et al. | 705/9 |
| 2004/0249568 A1 | 12/2004 | Endo et al. | |
| 2005/0015316 A1 | 1/2005 | Salluzzo | |
| 2005/0033614 A1 * | 2/2005 | Lettovsky et al. | 705/5 |
| 2005/0075913 A1 | 4/2005 | Brugger et al. | |
| 2005/0091005 A1 * | 4/2005 | Huard | 702/186 |
| 2005/0125439 A1 * | 6/2005 | Nourbakhsh et al. | 707/102 |
| 2005/0187703 A1 | 8/2005 | Seligmann | |
| 2005/0209772 A1 | 9/2005 | Yoshikawa et al. | |
| 2005/0216301 A1 | 9/2005 | Brown | |
| 2005/0227712 A1 | 10/2005 | Estevez et al. | |
| 2006/0004511 A1 | 1/2006 | Yoshikawa et al. | |
| 2006/0004590 A1 | 1/2006 | Khoo | |
| 2006/0009987 A1 * | 1/2006 | Wang | 705/1 |
| 2006/0010206 A1 * | 1/2006 | Apacible et al. | 709/205 |
| 2006/0106655 A1 | 5/2006 | Lettovsky et al. | |
| 2006/0109106 A1 | 5/2006 | Braun | |
| 2006/0129438 A1 | 6/2006 | Robinson | |
| 2006/0206363 A1 | 9/2006 | Gove | |
| 2006/0220374 A1 | 10/2006 | Dorn et al. | |
| 2006/0241983 A1 | 10/2006 | Viale et al. | |
| 2007/0011034 A1 | 1/2007 | Jones et al. | |
| 2007/0083327 A1 | 4/2007 | Brice et al. | |
| 2007/0123280 A1 | 5/2007 | McGary et al. | |
| 2007/0203741 A1 * | 8/2007 | Ordille et al. | 705/1 |
| 2007/0208604 A1 * | 9/2007 | Purohit et al. | 705/9 |
| 2007/0260989 A1 | 11/2007 | Vakil et al. | |

| | | | | | |
|---|---|---|---|---|---|
| 2008/0040188 A1 | 2/2008 | Klausmeier | 2009/0210261 A1 | 8/2009 | Mortimore, Jr. |
| 2008/0052159 A1 | 2/2008 | Balakrishnan | 2009/0234564 A1 | 9/2009 | Onishi et al. |
| 2008/0072067 A1 | 3/2008 | Koretz | 2009/0248457 A1 | 10/2009 | Munter |
| 2008/0103842 A1 | 5/2008 | Johnson | 2010/0211419 A1 | 8/2010 | Nickolayev et al. |
| 2008/0126143 A1 | 5/2008 | Altman et al. | | | |
| 2009/0106077 A1 | 4/2009 | Bhogal et al. | | | |

\* cited by examiner

METHOD AND SYSTEM FOR DELEGATION OF TRAVEL ARRANGEMENTS BY A TEMPORARY AGENT

This application is related to U.S. Provisional Patent Application No. 60/347,769, which was filed on Jan. 9, 2002; titled "Automatic Services Exchange", which is incorporated herein by reference. This application is also related to patent application Ser. No. 10/338,363 filed Jan. 7, 2003 titled "Automatic Services Exchange", and which is also incorporated herein by reference.

FIELD OF THE INVENTION

This invention relates generally to procurement of services, and more particularly to coordinating the group procurement of services.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Gazoo, Inc., All Rights Reserved.

BACKGROUND OF THE INVENTION

The increasingly mobile, remote and distributed nature of today's workforce makes it difficult for an organization to provide adequate administrative support for their workers. As a result, the workers themselves must spend part of their working day identifying, procuring, managing, coordinating and accessing the services they need to perform their job. Additionally, even people who are not mobile or remote workers find that they have less time to spend in organizing the services they need for their business or personal life.

This problem is further exacerbated when many workers must attend off-site events requiring travel plans including airfare, sleeping accommodations and local transportation. The distributed nature of the workforce could result in numerous people staying in varying hotels, renting individual cars and/or transportation to and from airports and event locations. This can add up to the redundant cost of travel-related services.

Another problem is the inherent lack of knowledge between workers as to who is attending a given event, further hindering a chance for coordinated travel arrangements. Online systems such as Evite, Yahoo Calendar and Microsoft Outlook have brought together group notices of events and meetings. This has allowed workers to know who has been invited and whether they plan to attend a given event. However such systems do not alleviate the problem of redundancy in the booking of event-related services to attend such off-site events. Organizations have an interest in reducing redundant expenses such as individual rental cars and hotel rooms. However, they often lack the bandwidth to coordinate a sharing of such services.

When people are traveling, sometimes events can require changes in the trip. Such changes may be due to outside influences, such as weather or equipment problems, or they may be due to schedule changes by another party whose plans and actions affect the schedule of the traveler(s). Such changes may then create the myriad of phone calls and confusion to address the unexpected changes.

As a result, what is further needed when changes occur during a trip, is that rather than each traveler in a group traveling together being responsible for making his own travel arrangements by himself, is a process to makes arrangements for the entire group during the travel.

SUMMARY OF THE INVENTION

Various systems and methods are described in connection with a coordination of group procurement of services. According to one aspect of the present invention, in response to an event, a first entity is automatically identified to adjust travel plans pre-established for one or more travel members. The identified first entity adjusts the pre-established travel plans for one or more members, and notifies one or more travel members of the adjustment to the pre-established travel plans. In one embodiment, the identified first entity is at least one of the one or more travel members, not one of the one or more travel members, or a software agent. In one embodiment, in response to an unavailability of the first entity, a predetermined alternative first entity is identified to adjust the pre-established travel plans. In one embodiment, in response to receiving a decline from one or more travel members, the one or more travel members are presented with one or more second travel adjustments. In one embodiment, the adjusting of the pre-established travel plans is based at least in part on a profile of one or more travel members.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

Figure 1A:
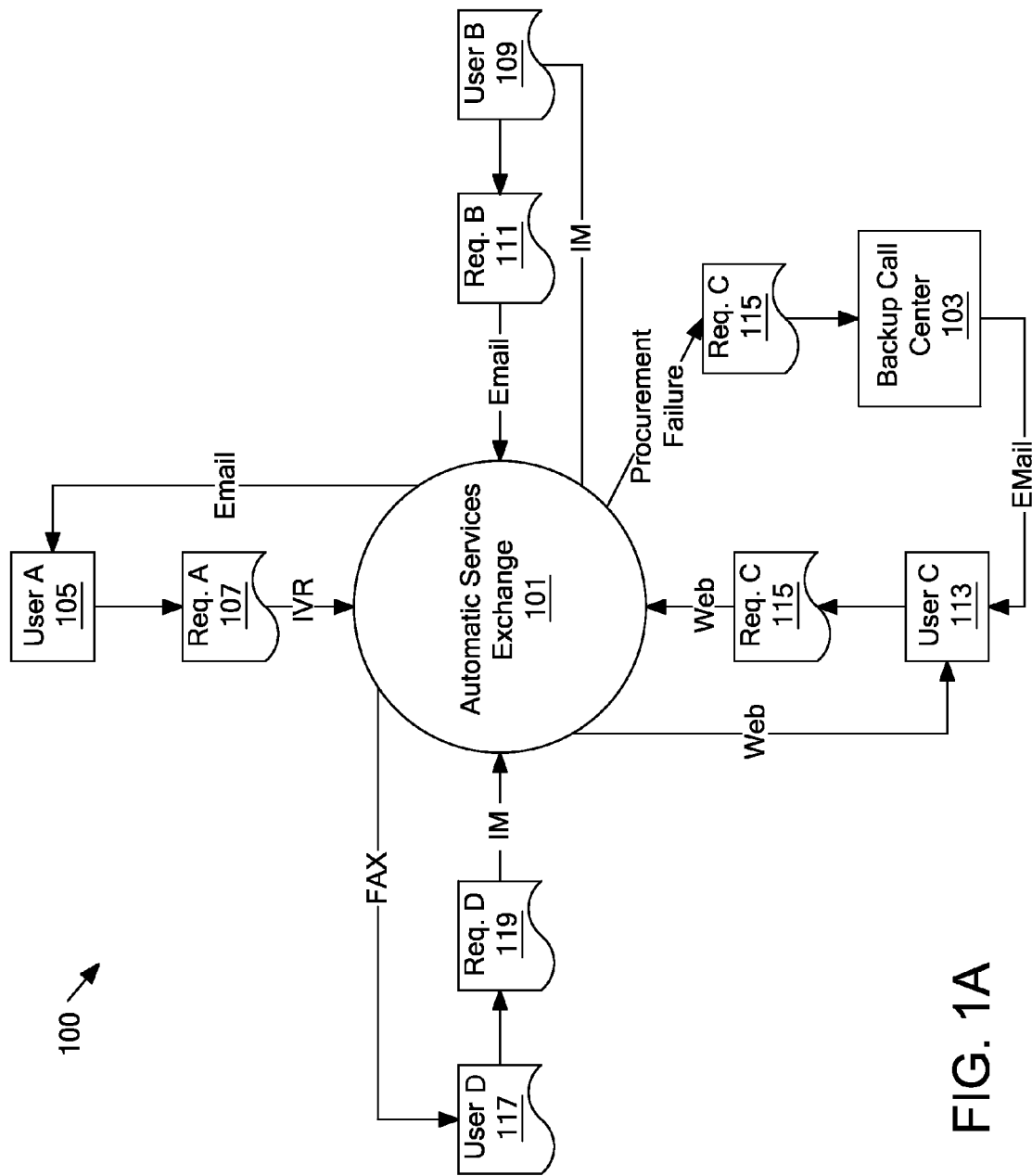
FIGS. 1A-C are diagrams illustrating a system-level overview of an embodiment of the invention.

According to another aspect of the present invention, an exemplary embodiment includes; defining a group of participants, defining a group leader, allowing other participants to view the reservations of the group leader and other participants, allowing other participants to add additional reservations onto the group leader's reservations, allowing resources of the reservations to be shared by other participants, whereby pre-defined policies may be considered, and altering existing reservations in order to synchronize travel plans with other participants of the group.

According to another aspect of the present invention, an exemplary embodiment includes receiving a request for a service and receiving data representing a time that is associated with a deadline for completion of a search for a match to the request, and communicating automatically through at least one electronic communication medium the request to a plurality of service providers.

According to another aspect of the present invention, an exemplary embodiment including a computing system comprising instructions disposed on a computer readable medium, the instructions capable of being executed by the computing system to perform a method including: defining a group of participants, defining a group leader, allowing other participants to view the reservations of the group leader and other participants, allowing other participants to add additional reservations onto the group leader's reservations, allowing resources of the reservations to be shared by other participants, whereby pre-defined policies may be considered, and altering existing reservations in order to synchronize travel plans with other participants of the group.

According to another aspect of the present invention, an exemplary embodiment including a computing system comprising instructions disposed on a computer readable medium, the instructions capable of being executed by the computing system to perform a method including: receiving a request for a service and receiving data representing a time that is associated with a deadline for completion of a search for a match to the request, and communicating automatically through at least one electronic communication medium the request to a plurality of service providers.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Automatic Service Exchange

A system level overview of the operation of one embodiment of an automatic services exchange system 100 is described by reference to FIGS. 1A-C. In FIG. 1A, the automatic services exchange system 100 is illustrated as having an automatic services exchange component 101 and an optional call center backup component 103. The automatic services exchange component 101 allows users such as a user A 105, user B 109, user C 113, and user D 117 to request services from the exchange. The service requests may be sent to the exchange component 101 through various communication media. For example, user A 105 sends its request A 107 to the exchange component 101 through an interactive voice response system (IVR), user B 109 sends its request B 111 to the exchange component 101 through e-mail (typically a structured e-mail), user C 113 sends its request C 115 via a Web browser, such as Internet Explorer or Netscape or a micro-browser on a WAP enabled cellular telephone, and user D 117 send its request D 119 through an instant messaging system (IM). These different communication media typically have different data formats, such as structured e-mail, or an Internet based markup language such as XML, or IVR voice recognition. Regardless of the communication media used to send the request to the exchange component 101, a response to a request may be sent back to the user through a different media. Thus, FIG. 1A illustrates that user A 105 receives its response through e-mail, user B 109 receives its response via instant messaging, and user D 117 receives its response via fax. In the case of user C 113, the same communication medium, Web, used to send the request is also used to send the response.

The services available through the exchange component 101 include travel services, entertainment service, personal services (e.g., haircutting), educational services, business administrative services and the like. Some services may be time critical, e.g., a dinner reservation at a particular time. The service request specifies other required criteria for the service, such as location (e.g., a certain geographic area), type, duration, quantity, price information (e.g., preferred price or price range and maximum price), etc. Additionally, a single service request may actually require services from multiple different service providers which are linked or associated. For example, if a user is planning a business trip, the request will often require services from airlines, hotels and car rental agencies and perhaps other services which are linked to or associated with the business trip.

The automatic services exchange component 101 automatically sends the service request to various service providers. In one embodiment, this transmission may be through several different electronic communication media such as structured e-mail, XML, IVR, etc. In the event that the exchange component 101 is unable to automatically procure the service requested by the user, the request is transferred to the backup call center component 103. For example, assume that request C 115 from user C 113 could not be automatically fulfilled by the exchange component 101. As illustrated in FIG. 1A, the request C 115 is sent to the backup call center 103 along with other information such as which service providers have already been contacted for the service. One of the human agents or operators at the backup call center 103 attempts to find a service provider for the request. Once the backup call center 103 determines that the request can or cannot be satisfied, it communicates the result to the corresponding user who made the request. In the example, the result is sent to user C 113 through e-mail.

Figure 1B:
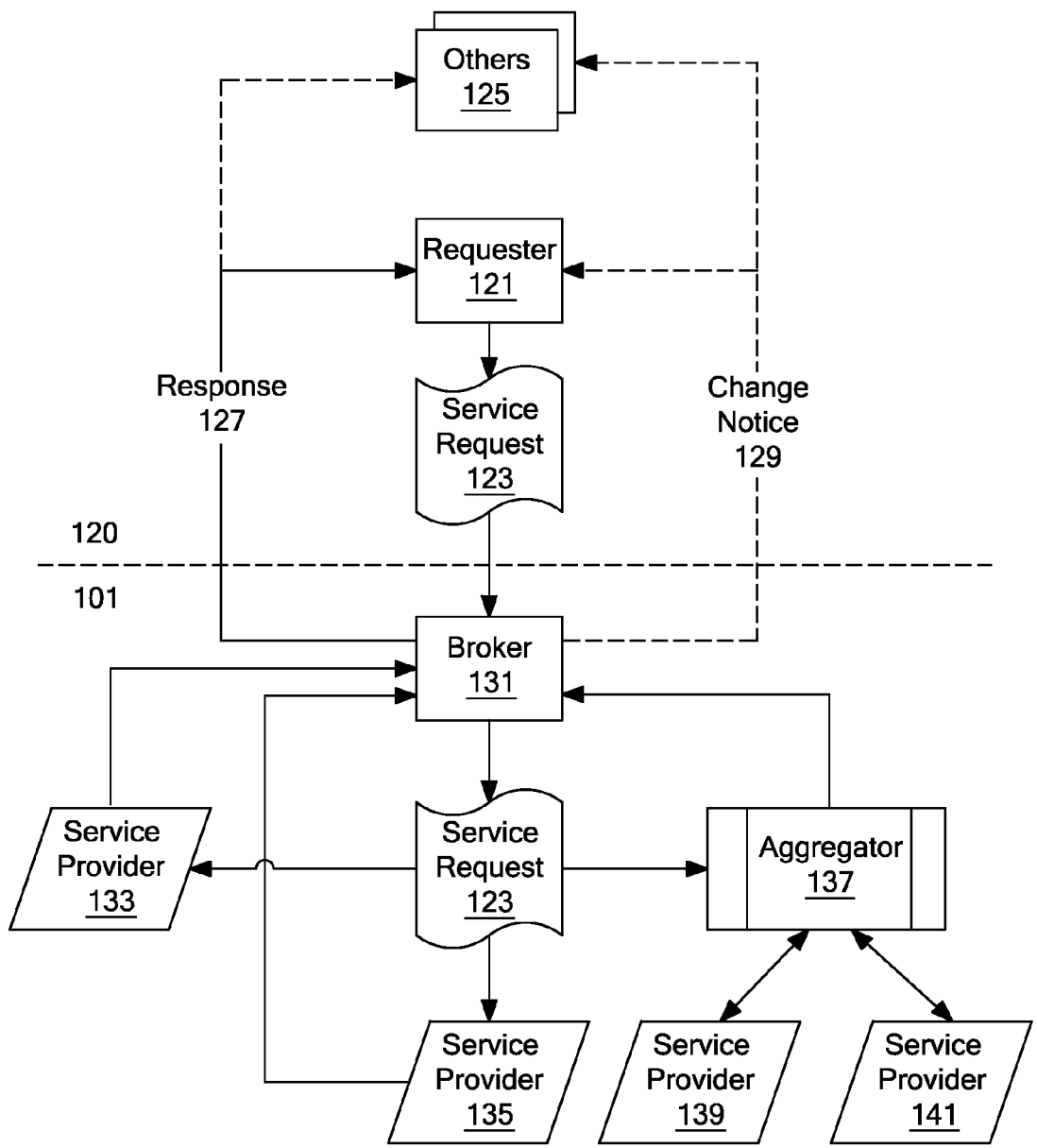
Figure 1C:
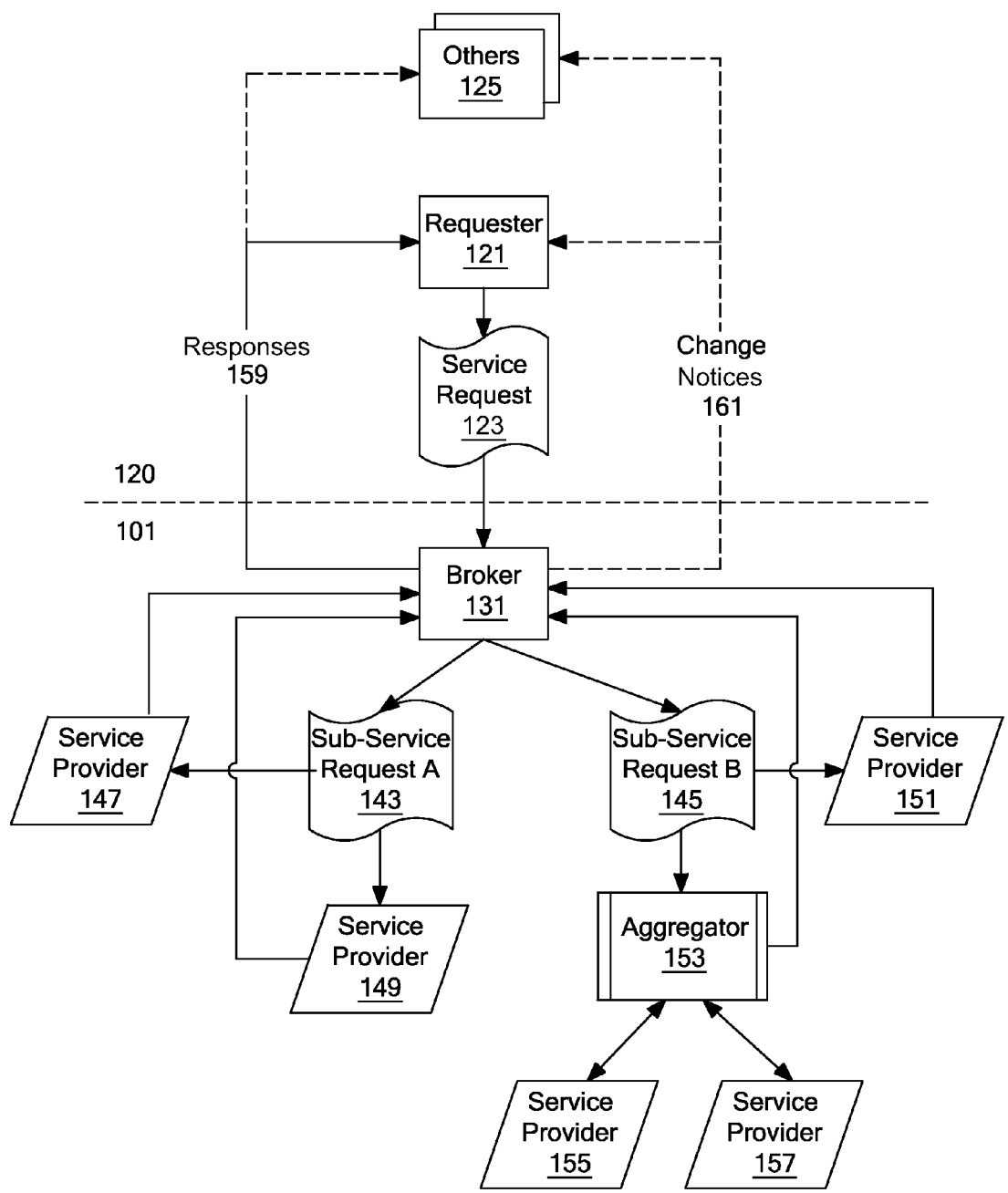

FIGS. 1B and 1C show the operation of the automatic services exchange component 101 in more detail. In FIG. 1B, a requestor 121 sends a service request 123 to the automatic services exchange 101. A broker function 131 receives a service request and passes it onto various service providers, such as service provider 133 and service provider 135. The service request may also be sent to an aggregator that represents multiple service providers, such as aggregator 137 that handles requests for service provider 139 and service provider 141, instead of directly to the service providers. In one embodiment, the service request is sent using an automatic system, such as an IVR system, that asks for a positive or negative reply to the request (e.g., a voice over the telephone says "press 1 if you have a table for two at 6:30 p.m. at your restaurant on XYZ date, press 2 if you do not"). Each of the service providers 133, 135 and the aggregator 137 replies to the broker 131 indicating whether they are able to provide the requested service. The responses to broker 131 may be through different communication media such as the Internet (e.g., via an XML page), structured e-mail, or IVR.

Assuming there is at least one positive reply, the broker 131 sends a response 127 to the requestor 121 with the results indicating at least one response matched the request. Depending on parameters set by the requestor 121, if multiple positive replies are received by the broker 131, the broker may choose the best match based on the required or predetermined criteria or it may send responses for all the positive replies to the requestor 121 for selection. The requestor 121 may also authorize the broker 131 to contract for the service under certain circumstances without waiting for approval from the requestor 121. A match to request typically means that the response from the service provider is within the range of acceptable requesting parameters such as time of service, location of service, price of service, level (e.g., quality requested) of service, and other parameters specified by the request.

As illustrated in phantom in FIG. 1B, the broker 131 may also send the response 127 to others 125 specified by the requestor 121. For example, when multiple people are planning a dinner, one person, the requester 121, may be in charge of obtaining the reservation, but the other people involved should receive notification of the particulars.

Also shown in phantom in FIG. 1B, is the capability of sending a change notice 129 to the requestor 121 if a procured service changes before its performance date. This change may occur by a modified request which is issued by the requestor 121. Similarly, the change notice 129 may also be sent to others 125 specified by the requestor 121. The requester can approve the change if the change is satisfactory, or submit a new service request if the change is unsatisfactory, or if the service is now unavailable from the original provider (not shown). The exchange system of the invention, in one embodiment, can automatically respond to a modified request.

The broker 131 reviews, through an automatic machine implemented process, the service requests to determine if the service request is actually a request for multiple services, such as multiple services which are linked or associated such as those associated with an event (e.g., a business trip which requires airline tickets, rental car reservation and hotel reservation). The resulting operation is illustrated in FIG. 1C. The broker 131 breaks such a request into sub-service requests 143 and 145 and sends each to the appropriate service providers. Thus, in FIG. 1C, sub-service request A 143 is sent to service providers 147, 149, while sub-service request B 145 is sent to service provider 151 and aggregator 153, which aggregates the services from service providers 155 and 157. As before, each service provider/aggregator typically returns a message to the broker 131 specifying its ability to provide the service. Each sub-service response 159 may be sent separately to the requestor 121 or the broker 131 may wait until all service providers/aggregators have responded or until a match to each sub-service request has been found. As in FIG. 1C, change notices 161 also will be sent to the user 121 upon a change in a procured service. Additionally, the responses 159 and the change notices 161 may be sent to others 125 specified by the requestor 121.

The particular methods of the invention are now described in terms of computer software with reference to a series of flowcharts. The methods to be performed by a computer constitute computer programs made up of computer-executable instructions illustrated as blocks (acts). Describing the methods by reference to a flowchart enables one skilled in the art to develop such programs including such instructions to carry out the methods on suitably configured computers (e.g., the processor of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figure 2A:
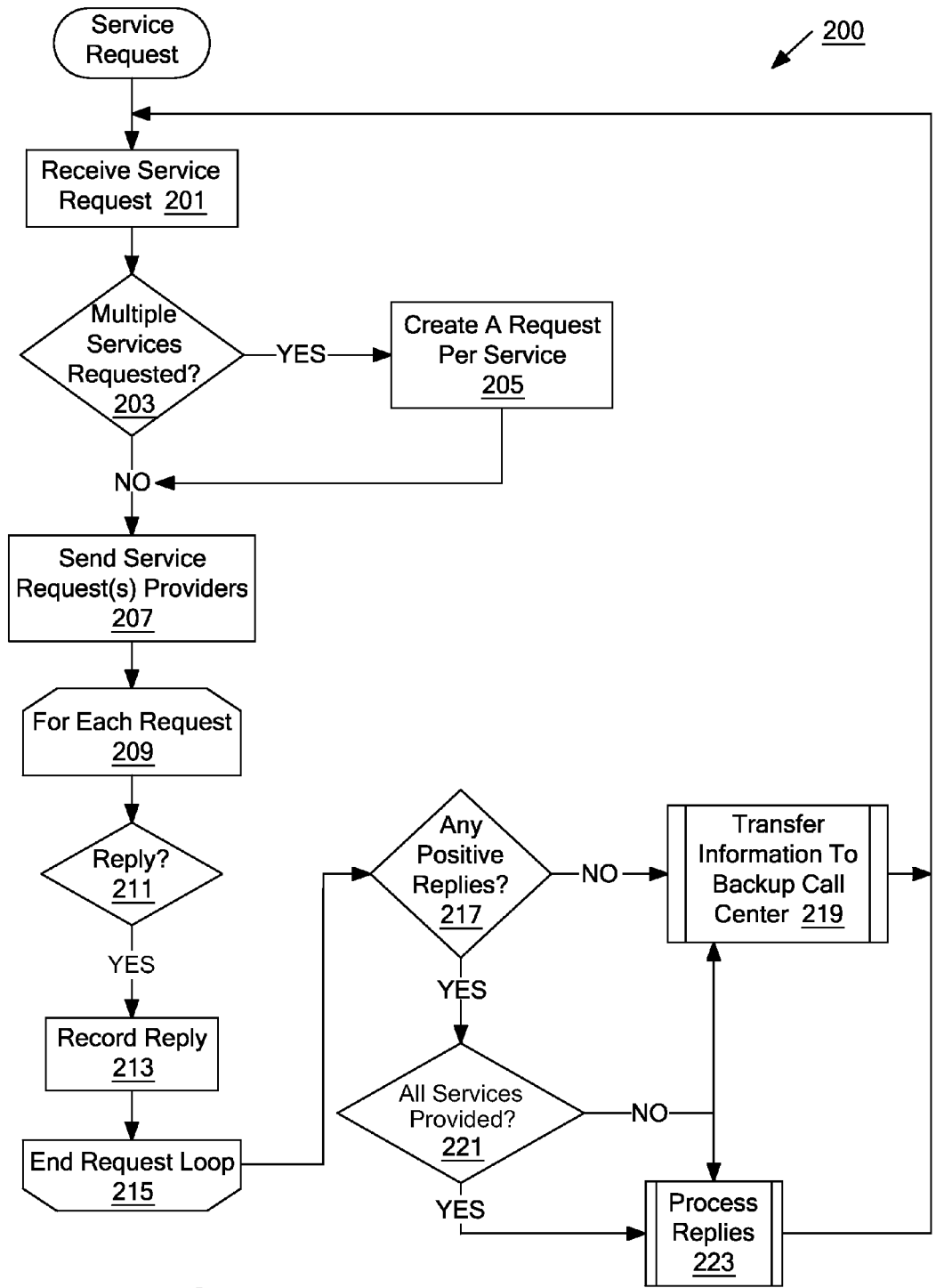
FIGS. 2A-C are flowcharts of methods to be performed typically by computers in executing the embodiment of the invention illustrated in FIGS. 1A-C.
Figure 2B:
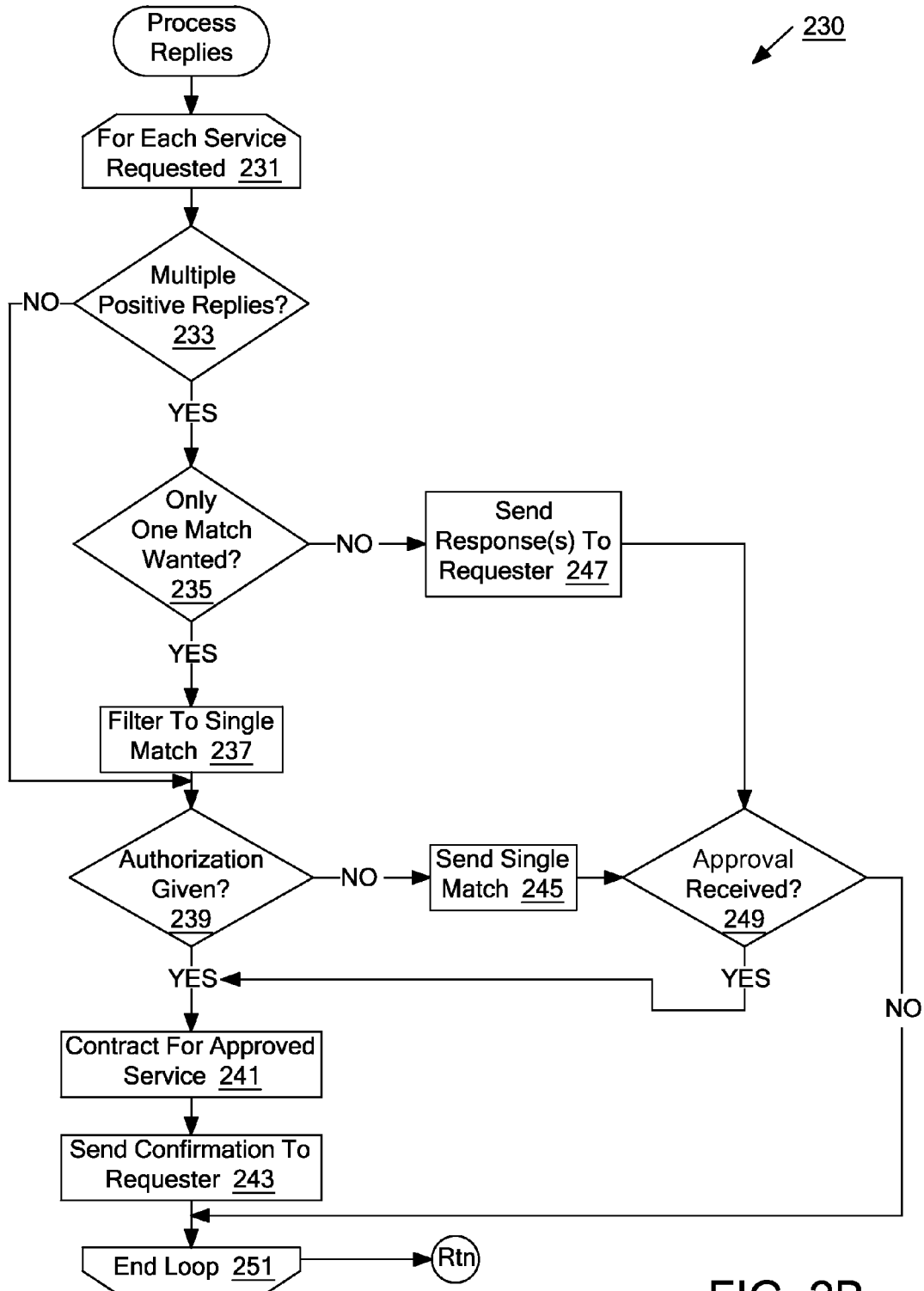
Figure 2C:
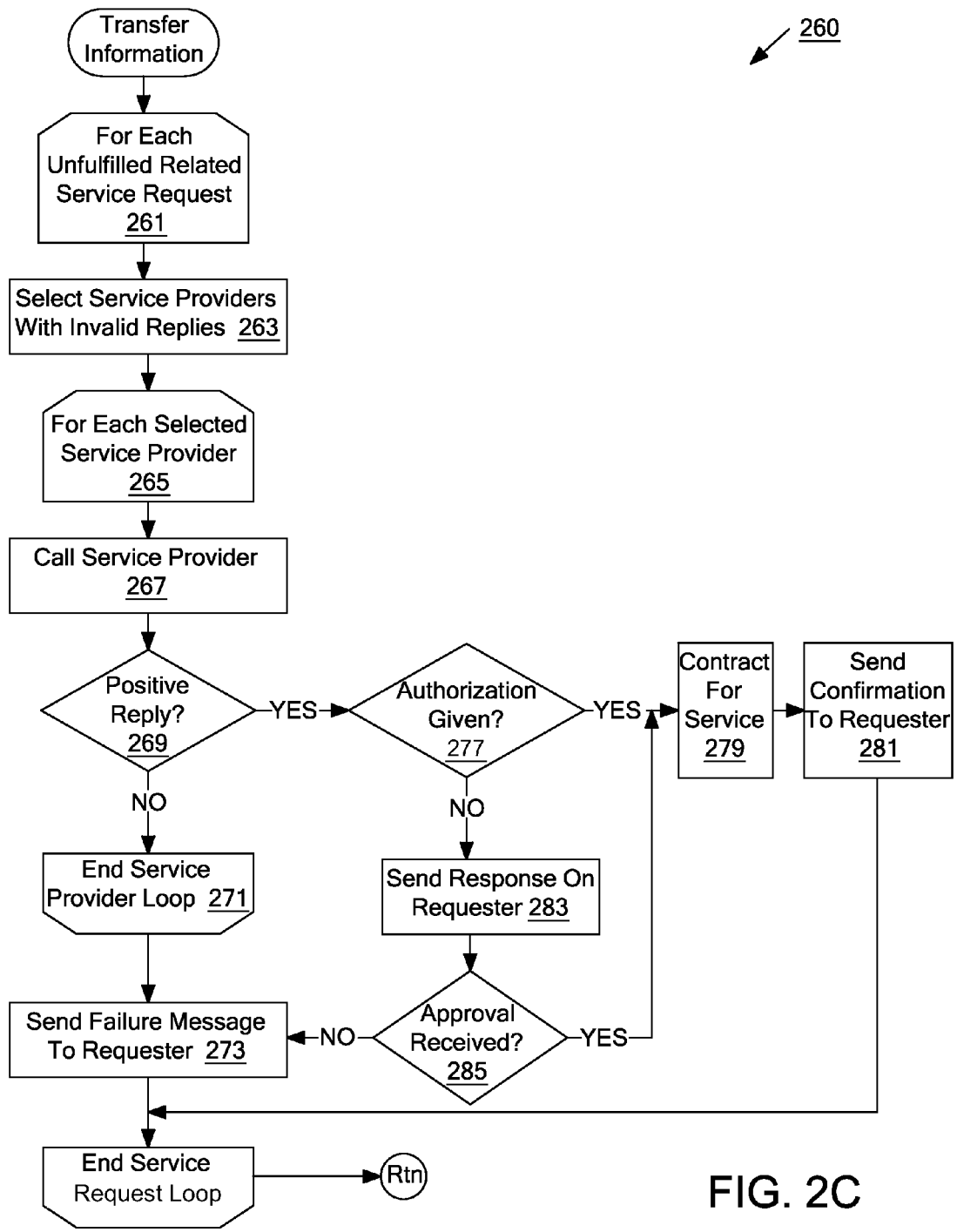
Figure 3:
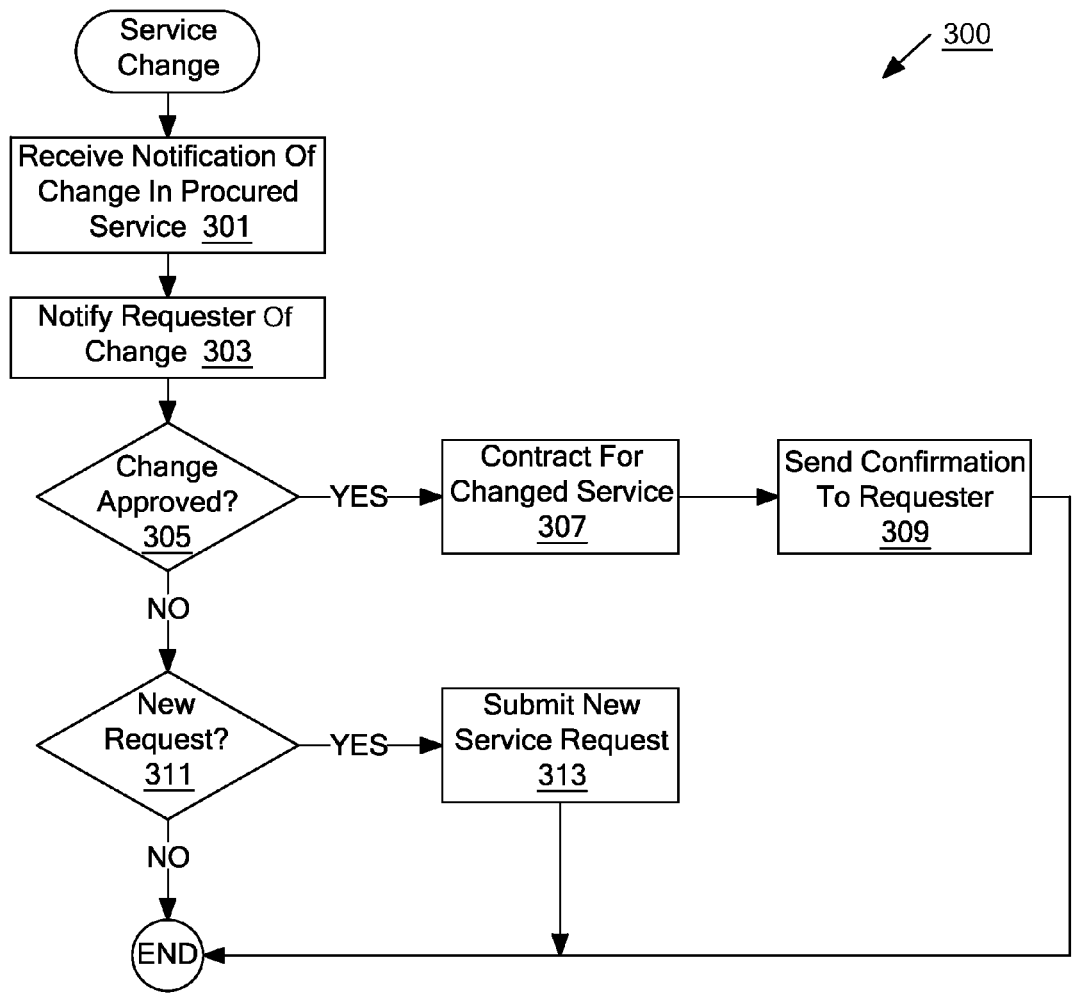
FIG. 3 is a flowchart of an optional method to be performed by a computer in executing the embodiment of the invention illustrated in FIGS. 1A-C.

FIGS. 2A and 2B illustrate the acts to be performed by a computer, or set of computers, acting as the automatic services exchange component 101 of FIG. 1A in processing service requests. FIG. 2C illustrates the acts to be performed by a computer acting in conjunction with the backup call center 103 in FIG. 1A. FIG. 3 illustrates the acts to be performed by the computer acting as the automatic services exchange component when the optional change notification is desired.

Referring first to FIG. 2A, a service request method 200 receives a service request method (block 201) and examines it to determine if there are multiple, related services requested (block 203). If so, the service request method 200 creates a request for each service (block 205). Once the multiple requests are created, or if there is only one request, the service requests are sent to the appropriate providers (including aggregators) for the services (block 207).

The service request method 200 processes the replies for each request separately as illustrated by request loop starting at block 209. It will be appreciated that multiple request loops may be running concurrently. The requestor may specify a time which is associated with a deadline for completion of a search for a match to a request. In one embodiment, the requestor specifies a predetermined required period of time (time out period or deadline) within which replies must be received or by which time the requestor should be contacted by the exchange to inform the requestor of the incomplete status of a request. In another embodiment, the time out period is determined by the method 200 based on time criteria specified in the request. The request loop waits at block 209 until an incoming reply is received or until the time out period expires. When the request loop is activated by an incoming reply (block 211), the reply is recorded at block 213. If all replies have not yet been received, the request loop returns to its wait state. If all replies have been received, the particular request loop ends (block 215) and the method 200 proceeds to block 217 to evaluate the replies. Alternatively, if the time out period expires before any or all replies are received, the method 200 also proceeds to block 217. The time out period can provide the exchange system with some time to attempt to "manually" (through the intervention of a human operator)

procure the service with enough time before the service is actually required. If the user/requestor fails to specify a time out period, the exchange system may specify a default time out period which is at least several hours before the requested time of the service (e.g., a 4:30 p.m. time out for a dinner reservation at 7:30 p.m.) or at least one day before the requested date of the service. Further, this time out period also allows the requestor to be notified of a failure to procure a service before the time requested for the service so that the requestor can take appropriate actions.

At block 217, the method 200 determines if any positive replies were received. If not, the corresponding request is transferred to the backup call center (which includes human operators) for processing along with all replies (block 219) so the backup call center knows the current status of the request (e.g., who has replied to the request, who has not, etc.). The processing represented by block 219 is described in more detail in conjunction with FIG. 2C further below.

If multiple services were requested, the method 200 determines if at least one service provider has replied positively to each service request (block 221). Requests that cannot been procured are sent to the backup call center at block 219, while positive replies are processed at block 223 (e.g., by sending out confirmations to the requestor and the service providers to secure the providing of the service). Similarly, if only one service was requested and at least one reply is positive, the method 200 proceeds to block 223 to process the reply. The processing represented by block 223 is described next.

One embodiment of a process reply method 230 is illustrated in FIG. 2B. It will be appreciated that multiple instances of the method 230 may be executing simultaneously based on the number of service requests that were made. For each service requested (block 231), the process reply method 230 determines if multiple positive replies for a service were received (block 233). If so, but only one match has been requested (block 235), the method 230 filters the replies to find a single match that best satisfies the criteria specified by the requestor (or specified as defaults by the system of the exchange service) (block 237). If there was only one positive reply for the service, or once a single reply has been filtered out in block 237, the method 230 determines if the requestor has authorized the automatic services exchange system to automatically procure the service (block 239). If so, the method 230 contracts or otherwise reserves the service from the corresponding service provider (block 241) and sends a confirmation request confirmation to the requestor that the service has been procured (block 243). In these situations where the service provider requires a commitment (e.g., a down payment or a deposit) from the requestor, the automatic services exchange provides payment information (e.g., credit card name, number and expiration date) previously provided by the requestor to the automatic services exchange or requests that this information be provided by the requestor to either the exchange (so it can be forwarded to the service provider) or to the service provider directly. If, however, there is no authorization (block 239), the information in the reply is sent to the requestor at block 245 and the method 230 waits to receive approval from the requestor. If approval is received (block 249), the method 230 contracts for or otherwise reserves the approved service and sends a confirmation as previously described. However, if approval of the particular service is not received from the requestor, the service request is terminated.

If more than one match is wanted at block 235 (as specified by a predetermined preference sent by the requestor or as set as a default by a system of the exchange service), a response containing all positive replies is sent to the requestor for selection (block 247) and the method 230 waits to receive approval of one of the providers at block 249. As in the case of a single reply, the method 230 contracts for or otherwise reserves the service from the approved provider at block 241 and returns a confirmation message at block 243, or the request is terminated if no approval is received.

Turning now to FIG. 2C, one embodiment of an information transfer method 260 for a backup call center is illustrated. When the service request is sent to the providers through an automatic system, a reply may be invalid such as when a person, in response to questions from an IVR system, presses an incorrect digit on a telephone key pad or hangs up without replying or if the call is unanswered. For each unfulfilled related service request (block 261), the method 260 selects those service providers that gave invalid replies (block 263). Each of the selected service providers (block 265) will be called by a human agent (block 267) until one provider is able to provide the service (block 269) or until all have been called (block 271). If no service provider can fulfill the service request, the method 260 sends a failure message to the requester at block 273. If there are no further related service requests (block 251), the method 260 terminates.

The first positive reply at block 269 causes the method 260 to determine if the requester has authorized the automatic services exchange system to automatically procure the service (block 277). If so, the method 260 contracts or otherwise reserves the service from the corresponding service provider (block 279) and sends a confirmation request confirmation to the requestor that the service has been procured (block 281). If, however, there is no authorization at block 277, the information in the reply is sent to the requestor (block 283) and the method 260 waits to receive approval from the requestor. If approval is received (block 285), the method 260 contracts for or otherwise reserves the approved service and sends a confirmation as previously described. However, if approval of the particular service is not received from the requestor, a failure message is sent to the requester at block 272.

As described previously, the automatic services exchange system optionally can send change notices to the requester to alert him/her of changes in a procured service or receive a modified request from the requestor even after the services have been procured. One embodiment of a service change method 300 that communicates changes is illustrated in FIG. 3. When the method 300 receives notification of a change in a procured service (block 301), it notifies the requester and asks if the requester approves the change or wishes to submit a new service request (block 303). If the change is approved (block 305), a message is sent to the service provider to contract for the changed service (block 307) and the change is confirmed to the requester (block 309). If the change is not approved but a new service request is submitted (block 311), the new request is resubmitted into the automatic services exchange system at block 313.

The particular methods performed by computers acting as the automatic services exchange and backup call center components for one embodiment of the invention have been described with reference to flowcharts in FIGS. 2A-C and 3, including all the acts from 201 until 223, from 231 until 251, from 261 until 285, and 301 until 313, respectively. It will be appreciated that more or fewer processes may be incorporated into the methods illustrated in FIGS. 2A-C and 3 without departing from the scope of the invention and that no particular order is implied by the arrangement of blocks shown and described herein and that alternative orders of the operations are within the scope of the invention.

Figure 4A:
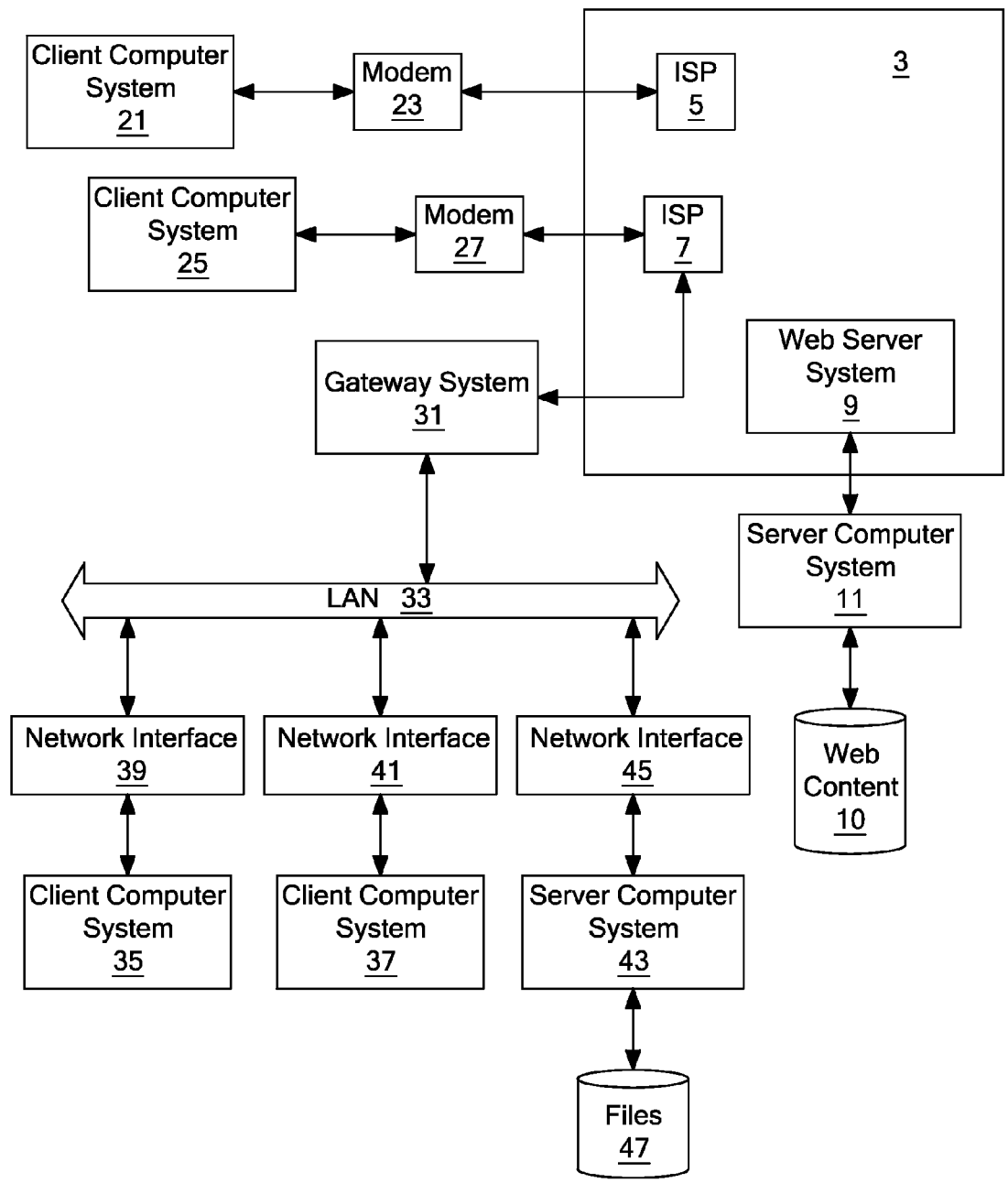
FIG. 4A is a diagram of one embodiment of an operating environment suitable for practicing the present invention.
Figure 4B:
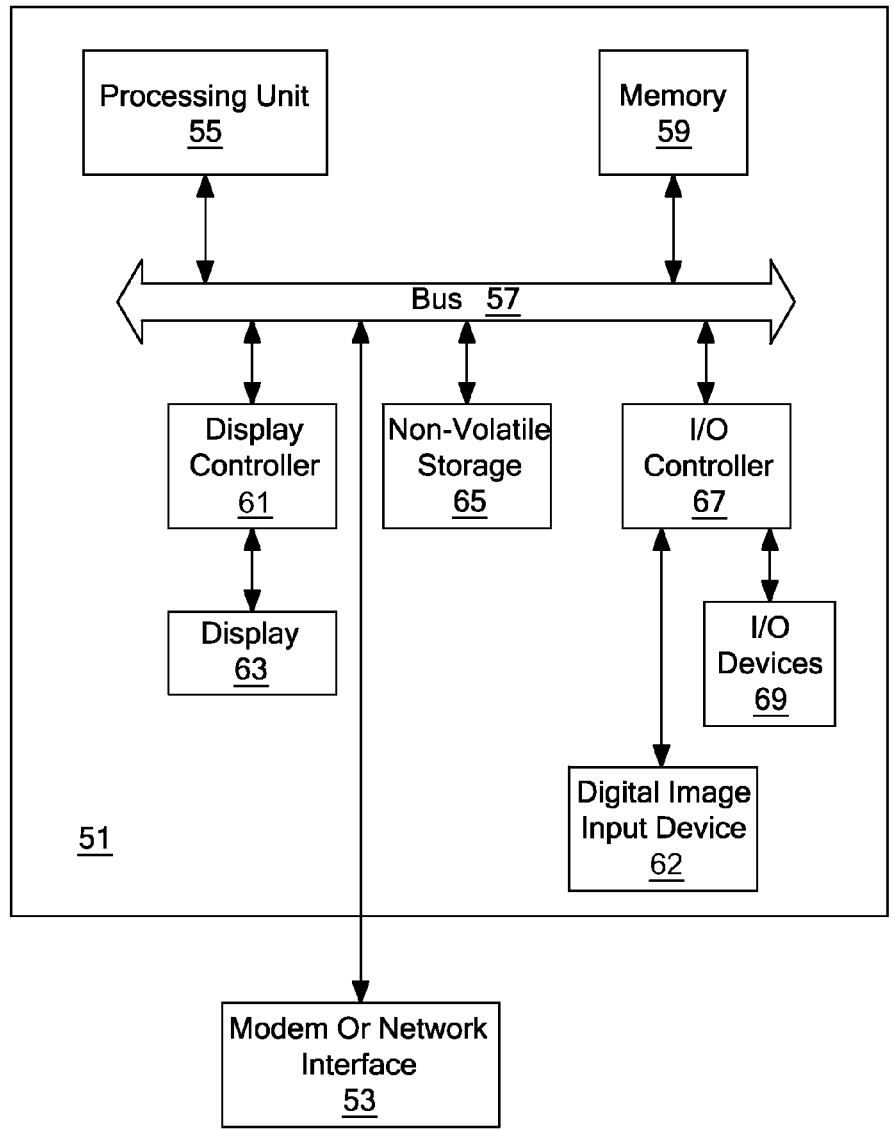
FIG. 4B is a diagram of one embodiment of a computer system suitable for use in the operating environment of FIG. 4A.

The following description of FIGS. 4A-B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices (e.g., PDAs—personal digital assistants such as a Palm Pilot; or cell phones, etc.), multiprocessor systems, microprocessor-based or programmable consumer electronics, network PCs, minicomputers, mainframe computers, and the like. The invention can also be practiced in distributed computing environments where tasks are performed by remote processing devices that are linked through a communications network having a physical or wireless infrastructure, or a combination of both.

FIG. 4A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7, through either physical or wireless interfaces. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 4A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld wireless device, or other such computer system. Similarly, the ISP 7 provides Internet connectivity for client systems 25, 35, and 37, although as shown in FIG. 4A, the connections are not the same for these three computer systems. Client computer system 25 is coupled through a modem interface 27 while client computer systems 35 and 37 are part of a LAN. While FIG. 4A shows the interfaces 23 and 27 as generically as a "modem," it will be appreciated that each of these interfaces can be an analog modem, ISDN modem, cable modem, satellite transmission interface (e.g., "Direct PC"), radio frequency (RF), cellular, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 4B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g., "Direct PC"), radio frequency (RF), cellular, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 62 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention.

Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 4B, such as certain input or output devices. A typical computer system will usually include at least a processor, memory, and a bus coupling the memory to the processor. Further, mobile devices, such as PDAs, browsing web phones etc. and their respective supporting infrastructure may also be used as clients etc.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

Coordination for Group Procurement of Services

One embodiment of the present invention permits group members to add additional reservations onto an existing reservation of a group leader, supervisor or any other member of the group in such a manner as to synchronize travel plans and coordinate locations, etc., both in terms of travel time, sharing rides, staying at the same hotel, tee times, and other services one may desire when attending an event. But rather than book all group members at once, individual group members may make plans separately, to accommodate instances in which group members are, for example, traveling from different locations, or are arriving at different times, etc. For example, a sales person may be coming from a different customer site in another city, while the marketing person and the technical person may be coming from the home office.

Figure 5:
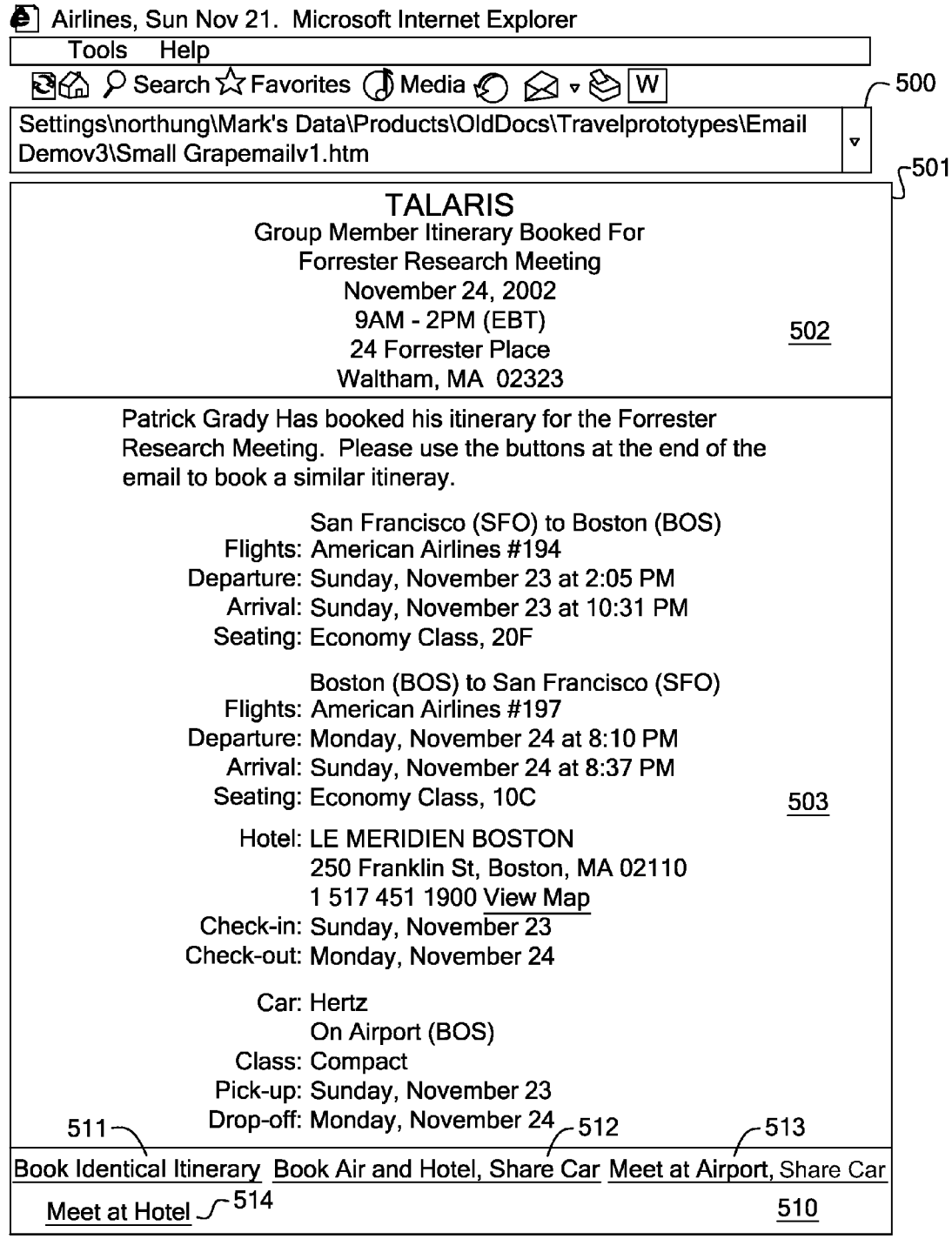
FIG. 5 illustrates screen shot as it would be seen by a group member, in accordance with one embodiment.

FIG. 5 shows a screen as it would be seen by such a group member. The data as displayed on the screen may be shared with the group members via an Internet media, or other alternative media. Section 500 is the header bar of the browser window, and section 501 is the application window for a specific set of services—in this case, travel and accommodations for a business meeting at a customer site. Heading section 502 for the event shows that members of the company Talaris are visiting Forrester Research in Waltham, Mass. Group members can see the travel itinerary of the group leader respectively the first person to book travel in section 503. As each member books travel and other services related to the meeting, the system automatically notifies, via the Internet or other media, the other members of the group and asks if they want to book identical travel services or similar travel services (e.g., start in a different location and ultimately end up at a destination together at a specific time). The system automatically would also coordinate sharing of resources such as a rental car or hotel rooms. Further, the system would enforce corporate policies related to the services being procured. For example, the system might require employees to share a rental car, a limo, a shuttle bus etc. if two or more employees are traveling on a similar trip.

Thus in the example embodiment shown in FIG. 5, group members have the options shown in section 510 to choose one of four travel options. It is clear that in other example embodiments, other, similar options, additional options, or fewer options may be offered. Section 511 is an option to book an identical itinerary, which would be suitable for a person starting the trip from the same location at the same time. This option allows group members to travel together. Section 512 allows group members to book separate, identical air and hotel reservations, but has them share a single car rental; section 513 allows members to meet at the airport upon arrival (in this example, at the Boston airport) so a group member flying in from, for example, New York, could meet with members flying in from San Francisco, to share the car into Walton; and section 514 allows for only booking rooms at the same hotel, so group members may come and go separately but stay at the same hotel, allowing them to meet and travel together to the company site conveniently.

The system illustrated in FIG. 5 is just one embodiment of the novel art of this disclosure for automated coordination of services procurement for a group of individuals involved in a common goal or event. In this and other embodiments, one of the individuals (the leader) would define the attributes of the event and specify the other individuals to be involved in the event (the "group"). All of the individuals would be automatically notified, via the Internet or other media, by the system that they are invited to participate in the goal or event, and all individuals would be able to accept or decline membership in the group event or goal, in some cases in accordance with company policies for such participation, expense rules, privacy rules etc. Likewise, all individuals who accept group membership would be able to procure a combination of services required to execute the event. All individuals who accepted the invitation to join the group would be notified of the booking of services by the other members of the group, and each individual in the group would be able to make a services procurement request for the services procured by any other individual or individual(s) in the group. The system is able to coordinate sharing of the services based on its understanding of the mutual requirements of the group, and is also able to adjust the services procured by members of the group to better meet the overall group's objectives. The system is likewise able to adjust the services procured by the members to optimize the use of the services by the group as a whole, or to intelligently cancel services based on changes in requirements input by one or more members of the group. In some cases, corporate policy may allow some participants to exceed their usual settings in context of a group event. In other cases, it may notify additionally their supervisor, procurement group, or human resources, and in yet other cases, it may require a confirmation by e-mail from a supervisor or similar. The type of services that may be procured are not limited to services related to travel, but rather may also include other services related to attending an event, or other activities to participate in while visiting a location.

Yet in some cases, if a member needs to come in late, for example due to a previous meeting, he may not share in some aspects, such as the share car ride for example etc. In other circumstances, if a member needs special facilities, not available at the hotel/car/flight chosen for the group, the member may break out of the group arrangements. This may be on a case by case basis, with approval and or notification of the group leader, his supervisor etc., or may be pre-defined in the member's profile in some cases.

Figure 6:
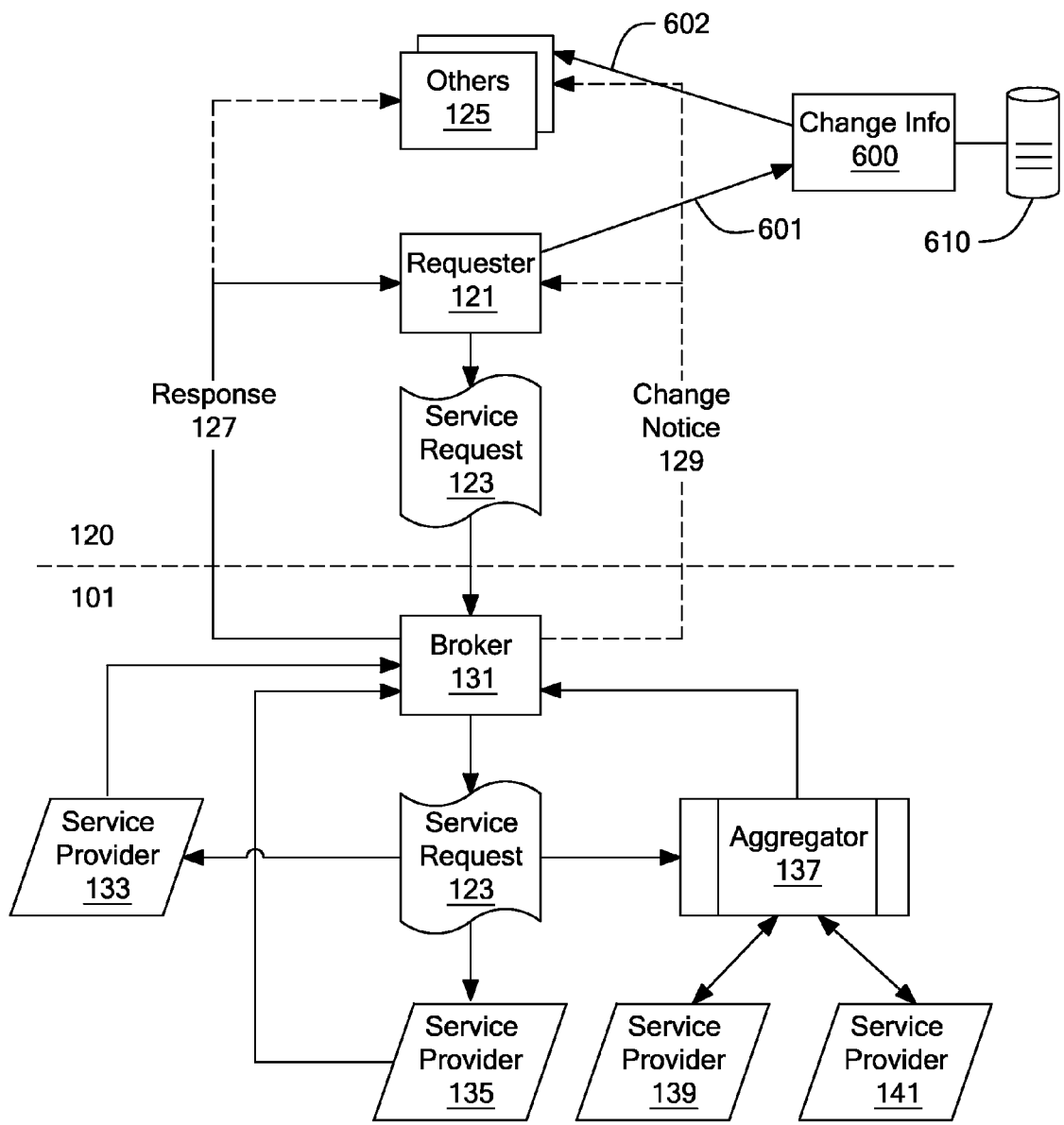
FIG. 6 illustrates block diagram of an alternative embodiment.

FIG. 6 illustrates a block diagram of an integration of the embodiment for providing coordination of group procurement of services integrated in the system of FIG. 1b, as discussed above. The integration includes the addition of a group information block 600 that allows the original requester 121 to export his travel plans via function 601 into block 600. The requester can assign group members into a group data base 610, so that when the designated group members log in as other users 125, they can see what travel options are available, pull them down via function 602, and then participate in making travel plans, as described above in relation to FIG. 5. Furthermore, as mentioned above, group member may receive a particular invitation, and in some cases, that may require a supervisor's approval.

In yet other cases, a user may be able to forward their service request in an automatic fashion. For example, a user could initiate a group by inviting others to join for a meeting at a specific date, time, and location. Once they have done this, they have formed a group. Once one member of the group has booked their travel for this particular meeting, they would be prompted to see if they are willing to share their itinerary with the other members of the group. If they give permission for the other members to see the itinerary, all other members of the group would be automatically notified by the system. When notified, the other members of the group would be given options to book similar or identical services. When other group members select an option, a service request such as (123) in FIG. 6 is automatically generated and sent to the services exchange.

Just before, or during, the travel unexpected events may occur that necessitate changes to the travel plans. For example, two parties may plan to travel and meet in a third city, but then one is delayed. To accommodate such occurrences, one embodiment of the present invention provides a process to automatically and dynamically identify an entity to adjust the pre-established travel plans to accommodate one or more of the travelers.

This rebooking of the flights and rides, etc., obviously could be done manually on a person-by-person basis, but preferably one group manager (e.g., an assistant or group member) could do the rebooking for the whole group. In one embodiment, the group manager doing the rebooking could be a robotic software agent or entity, being present as part of the reservation system and following certain preprogrammed rules.

Figure 7:
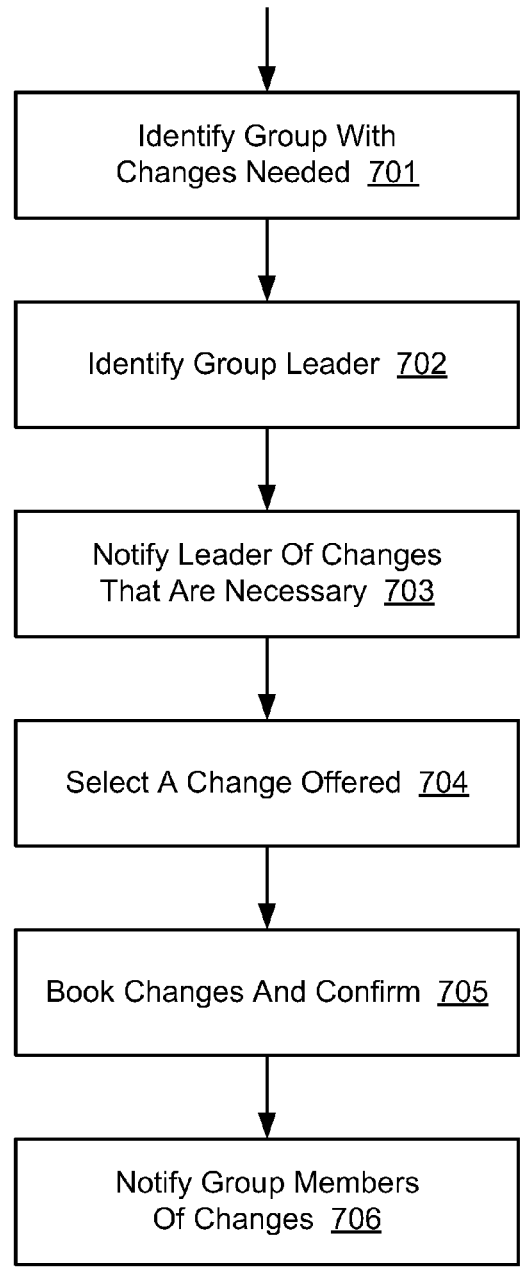
FIG. 7 illustrates a flow diagram describing the processes in accordance with one embodiment.

FIG. 7 presents a flow diagram of semi-automated service software instance 700 of the novel art of the current invention. This software instance 700 may execute for example on server 42 (FIG. 4A) and interact with all the modules necessary, acting as a Group Services Management System (GSMS). This software instance 700 is the entity to handle changes in travel arrangements according to the novel art of this disclosure. In step 701, the group whose event must be rebooked is identified to the system. This may be done separately by a software (not shown), monitoring all services and events for which the group database 610 has bookings. When a change occurs, the GSMS 700 identifies in step 702, the group manager, previously selected when the group parameters were entered into the system. Said group manager could be a person, as noted earlier, or could be a robotic software agent (not shown). There also may be rules within the GSMS that if no human manager is identified, the manager may default to a robotic agent. Additionally, there may be rules to check a series of alternates, if the group manager is unavailable, until an available alternate is found.

In step 703, the GSMS notifies the manager of the changes that must take place to arrange rebooking all arrangements (different services, including such as hotel rooms, restaurant reservations, flights, limos, rental cars, deliveries etc.) of the event (locations, rides, hotel rooms, meetings, Web conferences, Audio conferences, catering, etc.). In some cases, the GSMS may need to offer alternatives. For example, a subset of invitees or listed attendees for a scheduled meeting (M1) that needs to be rescheduled, may be unable to attend the rescheduled meeting M1R (possibly due to a calendar conflict), and thus the meeting would have to be canceled.

Based on such scenarios, and rules as they may be stored for the event group in group database 610, or general rules of the enterprise or organization, in step 704 one or multiple options may be offered to the group manager, who may then make the decision and confirm selection of one among the offered options. In step 705, the GSMS rebooks arrangements as necessary and confirms all the arrangements, including flights, transportation, hotels, restaurants, etc. In step 706 the GSMS issues alerts and notifies all the parties in the group of the travel arrangements.

In one embodiment, it may be further useful for the system 700 according to the present invention also to know how to modify these options based on a user's profile. For example, a traveler's home location, unique starting destination, past list of flights, and/or necessary arrival times based for scheduled meetings of the traveler's original itinerary.

In one embodiment, the system might also do a quick calendar check before displaying the user's flight or other travel options, and show a visual alert to the respective traveler that existing travel arrangements may be in conflict with proposed changes.

Also, as changes occur in real time, a quick response is necessary, and in some cases, if an appointed group agent cannot respond in time, the system may escalate according to a set of rules to switch over to an automatic assumption of the role of group manager by the above-mentioned software agent. Such a change may be required, for example, if the group agent is on a plane himself, or in a different time zone, etc., and cannot be reached until after a time at which a decision for rebooking must be made. Alternatively, the system may escalate directly (i.e., if it knows the agent is not reachable) or it may first escalate to a backup designated agent. Further, in some cases, the system can automatically offer options to the user via email when they accept or decline original meeting invitation.

Furthermore, in some cases, the system can also take into account "criticality" of each resource and event when suggesting options or making decisions for the group. For instance, if the VP of Sales is designated as a critical person for a meeting, then first try to move his travel plans if meeting has to change. In case his requirements can't accommodate a new meeting time or location, then, for example, the system might not automatically move others, because meeting shouldn't happen without him.

It is clear, that many modifications may be made, without departing from the spirit of the invention. For example, a shared screen may be offered allowing all members of the group to concurrently view availability, and decide over a multitude of alternative options.

The embodiments as described herein allow for very efficient procurement of services, such as, for example, synchronization of business travel plans, within an existing organizational infrastructure. It also reduces the overhead for auxiliary personnel, such as assistants and secretaries trying to coordinate the plans of many group members. It is clear that many modifications and variations of this embodiment may be made by one skilled in the art without departing from the spirit of the novel art of this disclosure. For example, in some cases, such system and method can be used by consumers to similarly coordinate family gatherings/trips, etc.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in them selves recite only those features regarded as essential to the invention.

The invention claimed is:

1. A computer implemented method comprising:
   in response to an unexpected travel event, automatically identifying, via a computing device, a sole first entity to adjust travel or meeting plans pre-established for one or more group members, the first entity having exclusive authority over the one or more group members to make adjustments to travel;
   appointing, via the computing device, a human group manager as the first entity;
   determining, via the computing device, that the human group manager, as the first entity, is unable to timely respond to the unexpected travel event;
   when the human group manager is unavailable, applying, via the computing device, a set of predetermined rules to accomplish an escalation to check a series of alternatives to the human group manager until an available alternative to the human group manager is found to make adjustments to travel;
   identifying, via the computing device, according to the set of predetermined rules to accomplish an escalation, a software agent as the first entity in substitution for the human group manager;
   receiving, via the computing device, information from the identified first entity concerning adjusting the pre-established travel or meeting plans for the one or more members;
   changing, via the computing device, the travel or meeting plans for a first member of the one or more group members based on criticality of attendance by the first member of the one or more group members at a travel destination or meeting as a primary requisite;
   changing, via the computing device, the travel or meeting plans for at least a second member of the one or more group members as a secondary requisite, after the changing of the travel or meeting plans for the first member;
   changing, via the computing device, the travel plans for the one or more members of the group members based on synchronizing the travel plans among the one or more group members as a tertiary requisite, after the changing of the travel or meeting plans for the second member;
   making accessible, via the computing device, to the identified first entity information regarding a modification of the pre-established travel or meeting plans; and
   automatically notifying, via the computing device, the one or more group members of the modification of the pre-established travel or meeting plans, the modification involving new travel arrangements.

2. The method of claim 1, wherein a second party created the pre-established travel or meeting plans.

3. The method of claim 1, further comprising:
   in response to an unavailability of the first entity, identifying a predetermined alternative first entity to adjust the pre-established travel or meeting plans.

4. The method of claim 3, wherein the unavailability of the first entity includes one of the first entity not responding within a predetermined period of time, and the first entity being previously designated as unavailable.

5. The method of claim 1, wherein the adjusting of the pre-established plans further includes:
   presenting one or more group members with one or more first travel or meeting adjustments in response to the event; and
   in response to receiving approval from one or more group members, proceeding with the travel or meeting adjustment for the respective group member.

6. The method of claim 5, further including:
   in response to receiving a decline from one or more group members, presenting one or more group members with one or more second travel or meeting adjustments.

7. The method of claim 1, wherein the adjusting the pre-established travel or meeting plans is based at least in part on a profile of one or more group members.

8. The method of claim 7, wherein the profile is at least one of scheduled meetings or events, and meetings or events to be scheduled.

9. The method of claim 1, wherein the adjusting the pre-established travel or meeting plans includes:
   taking into account a pre-determined critical factor in the pre-established travel or meeting plans for a particular group member; and
   altering the pre-established travel or meeting plans for other group members only when the pre-determined critical factor can be satisfied.

10. The method of claim 1, further comprising:
    subsequent to the receiving information about the identified first entity adjusting, separately notifying the first entity of one or more adjustments to the pre-established travel or meeting plans that are to be made in response to the event.

11. A non-transitory machine readable medium having stored thereon a set of instructions, which when executed by a computing device, cause the computing device to perform a method comprising:
    in response to an unexpected travel event, automatically identifying a sole first entity to adjust travel or meeting plans pre-established for one or more group members, the first entity having exclusive authority over the one or more group members to make adjustments to travel;
    appointing a human group manager as the first entity;

determining that the human group manager, as the first entity, is unable to timely respond to the unexpected travel event;
when the human group manager is unavailable, applying a set of predetermined rules to accomplish an escalation to check a series of alternatives to the human group manager until an available alternative to the human group manager is found to make adjustments to travel;
identifying, according to the set of predetermined rules to accomplish an escalation, a software agent as the first entity in substitution for the human group manager;
receiving information from the identified first entity concerning adjusting the pre-established travel or meeting plans for the one or more members;
changing, via the computing device, the travel or meeting plans for a first member of the one or more group members based on criticality of attendance by the first member of the one or more group members at a travel destination or meeting as a primary requisite;
changing, via the computing device, the travel or meeting plans for at least a second member of the one or more group members as a secondary requisite, after the changing of the travel or meeting plans for the first member;
changing, via the computing device, the travel plans for the one or more members of the group members based on synchronizing the travel plans among the one or more group members as a tertiary requisite, after the changing of the travel or meeting plans for the second member;
making accessible, via the computing device, to the identified first entity information regarding a modification of the pre-established travel or meeting plans; and
automatically notifying via the computing device, the one or more group members of the modification of the pre-established travel or meeting plans, the modification involving new travel arrangements.

12. The machine readable medium of claim 11, wherein a second party created the pre-established travel or meeting plans.

13. The machine readable medium of claim 11, further comprising:
in response to an unavailability of the first entity, identifying a predetermined alternative first entity to adjust the pre-established travel or meeting plans.

14. A system comprising:
a processor;
a network connection; and
a memory having stored thereon a set of instructions, which when executed by the processor cause the processor to perform a method comprising:
in response to an unexpected travel event, automatically identifying a sole first entity to adjust travel or meeting plans pre-established for one or more group members, the first entity having exclusive authority over the one or more group members to make adjustments to travel;
appointing a human group manager as the first entity;
determining that the human group manager, as the first entity, is unable to timely respond to the unexpected travel event;
when the human group manager is unavailable, applying a set of predetermined rules to accomplish an escalation to check a series of alternatives to the human group manager until an available alternative to the human group manager is found to make adjustments to travel;
identifying, according to the set of predetermined rules to accomplish an escalation, a software agent as the first entity in substitution for the human group manager;
receiving information from the identified first entity concerning adjusting the pre-established travel or meeting plans for the one or more members;
changing, via a computing device, the travel or meeting plans for a first member of the one or more group members based on criticality of attendance by the first member of the one or more group members at a travel destination or meeting as a primary requisite;
changing, via the computing device, the travel or meeting plans for at least a second member of the one or more group members as a secondary requisite, after the changing of the travel or meeting plans for the first member;
changing, via the computing device, the travel plans for the one or more members of the group members based on synchronizing the travel plans among the one or more group members as a tertiary requisite, after the changing of the travel or meeting plans for the second member;
making accessible, via the computing device, to the identified first entity information regarding a modification of the pre-established travel or meeting plans; and
automatically notifying, via the computing device, the one or more group members of the modification of the pre-established travel or meeting plans, the modification involving new travel arrangements.

15. The system of claim 14, wherein the adjusting of the pre-established plans further includes:
presenting one or more group members with one or more first travel or meeting adjustments in response to the event; and
in response to receiving approval from one or more group members, proceeding with the travel or meeting adjustment for the respective group member.

16. The system of claim 15, further including:
in response to receiving a decline from one or more group members, presenting one or more group members with one or more second travel or meeting adjustments.

17. The system of claim 14, wherein the adjusting the pre-established travel or meeting plans is based at least in part on a profile of one or more group members.

18. The system of claim 17, wherein the profile is at least one of scheduled meetings or events, and meetings or events to be scheduled.

* * * * *